Feb. 10, 1948. O. D. GRANDSTAFF 2,435,681
CURRENT RECTIFYING SYSTEM
Filed March 25, 1944 3 Sheets-Sheet 1

INVENTOR:
OTHO D. GRANDSTAFF

BY
Davis, Lindsey, Smith & Shonts,
ATTORNEYS.

Feb. 10, 1948. O. D. GRANDSTAFF 2,435,681
CURRENT RECTIFYING SYSTEM
Filed March 25, 1944 3 Sheets-Sheet 2
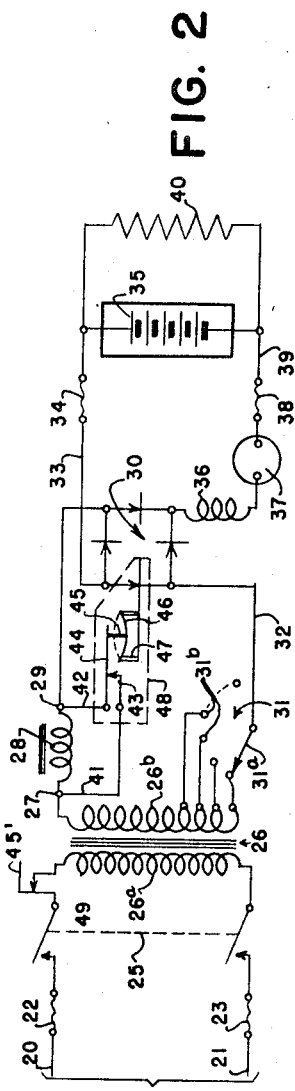
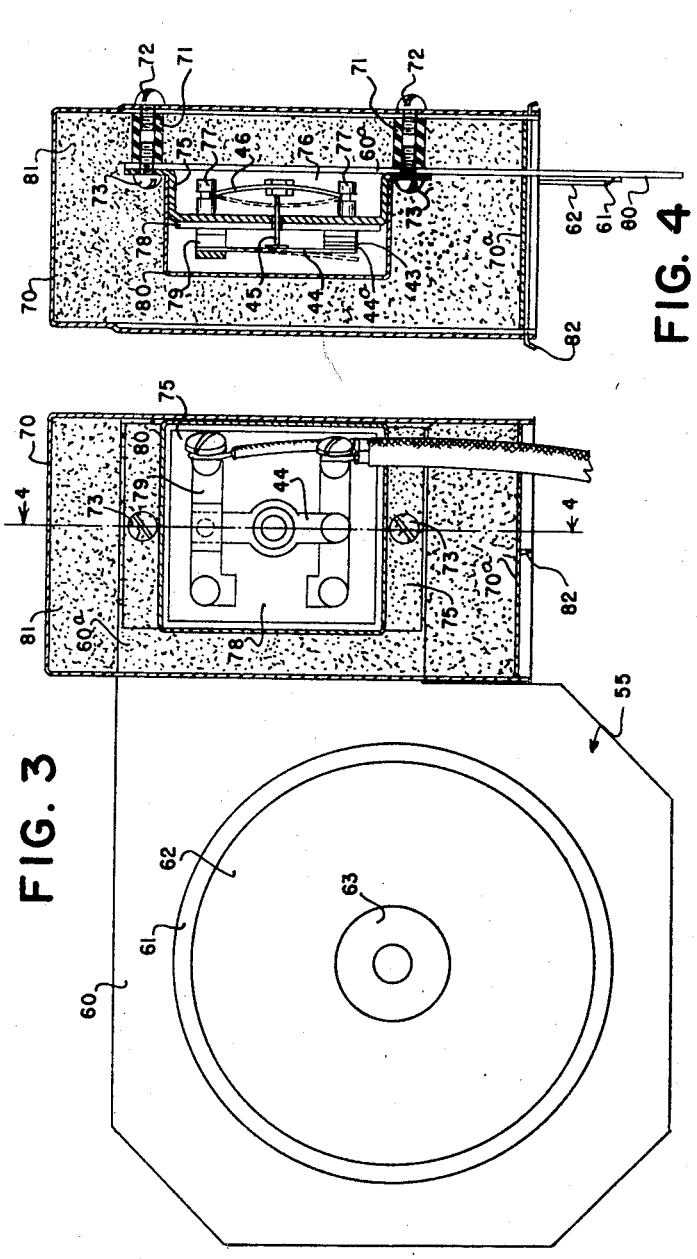
INVENTOR:
OTHO D. GRANDSTAFF
ATTORNEYS.

Feb. 10, 1948.     O. D. GRANDSTAFF     2,435,681
CURRENT RECTIFYING SYSTEM
Filed March 25, 1944     3 Sheets-Sheet 3

INVENTOR.
OTHO D. GRANDSTAFF
BY Davis, Lindrey, Smith & Shoals,
ATTORNEYS

Patented Feb. 10, 1948

2,435,681

UNITED STATES PATENT OFFICE 2,435,681

CURRENT RECTIFYING SYSTEM

Otho D. Grandstaff, Oak Park, Ill., assignor to Automatic Electric Laboratories, Inc., Chicago, Ill., a corporation of Delaware Application March 25, 1944, Serial No. 528,074

8 Claims. (Cl. 175—363)

This invention relates to electrical power supply systems and, in particular, to improvements in rectifying devices which are employed for converting alternating current to direct current, which may be desirable when a supply of direct current is needed for battery charging purposes or for effecting the operation of apparatus which is capable of being actuated only by direct current. More particularly, the invention relates to improvements in rectifiers of the dry plate type in which a plurality of plates, having a high resistance to the passage of current in one direction and a low resistance to the passage of current in the other direction, are commonly arranged in stacks and so connected in an electric circuit that they operate to connect in sequence the values of the alternating current which are in the same direction so that a unidirectional current is produced. Rectifiers of the dry plate type generally employ plates each made up of a plurality of superimposed layers, one of which is selenium or copper oxide, and it is this last mentioned layer which gives to the plate its rectifying function.

Rectifiers of this general type have been quite satisfactory in commercial use except for difficulties arising from variations in temperature and various means have been employed to effect the cooling of the rectifier elements, including the construction of these elements as comparatively thin plates or disks forming the rectifier stack and the use of a forced circulation of air or oil to dissipate the heat which is generated in the rectifier elements during their operation. Provision has also been made for limiting the extent of the heating of the rectifier elements in order to prevent damage thereto but, so far as is known, these devices have been operated in response to the ambient temperatures of the rectifier elements and not in direct response to the temperatures of the rectifier elements themselves. Due to the fact that the ambient temperature may differ substantially from that of the rectifier element, such protective devices have not been entirely satisfactory. Because of that fact, it has been possible for the rectifier elements to become heated to dangerous temperatures without causing any response of the protective devices for opening either the input or the output circuit of the rectifier. In some instances, the protective devices have responded to extraneous influences upon the ambient temperature of the rectifier, not brought about by the temperature of rectifier elements, so that false and unnecessary operations of the protective devices have been produced.

The principal object of the present invention is to overcome the above-mentioned difficulties, and others, by providing an improved current rectifying system in which the rectifier is protected by a thermally controlled switch which has a thermostatic element in direct connection with the rectifier elements to be controlled, and which is preferably insulated from the ambient heat surrounding the unit, so that the switch is responsive only to changes in temperature of the rectifier element and is operable to control ei her the input or the output circuit, or both circuits, of the current converting system for the purpose of preventing injury to any parts of the apparatus in case there is an undue rise in the temperature of the rectifier elements. A further object of the invention is to provide a power supply system, including rectifying apparatus, in which means are provided for protecting the system against overload by a thermo-responsive device which is directly connected with the rectifier element of the apparatus. Another object of the invention is to provide a rectifying apparatus of the dry plate type comprising a thermostatically controlled device, responsive directly to changes in temperature of the rectifying apparatus, for reducing the current of the output circuit when the rectifying device becomes heated to a predetermined temperature. Still another object of the invention is to provide a battery charging system comprising a rectifier unit of the dry plate type and an overload device which is responsive solely to the temperature of the rectifier unit for controlling the charging rate of the battery. Other objects relate to various features of the improved rectifying system and apparatus which will appear more fully hereinafter.

The nature of the invention will be understood from the following specification taken with the accompanying drawings in which one embodiment is illustrated. In the drawings, Figure 1 shows a front elevation of one form of rectifier embodying features of the present invention, the casing being shown in vertical section;

Fig. 2 is a diagrammatic view of the circuit sections of a rectifying system embodying the present invention and including rectifiers shown in Fig. 1;

Fig. 3 is a vertical section, taken on the line 3—3 of Fig. 1, showing on an enlarged scale the thermal switch by which the operation of the system is controlled;

Fig. 4 is a vertical section taken on the line 4—4 of Fig. 3; and

Figure 1:
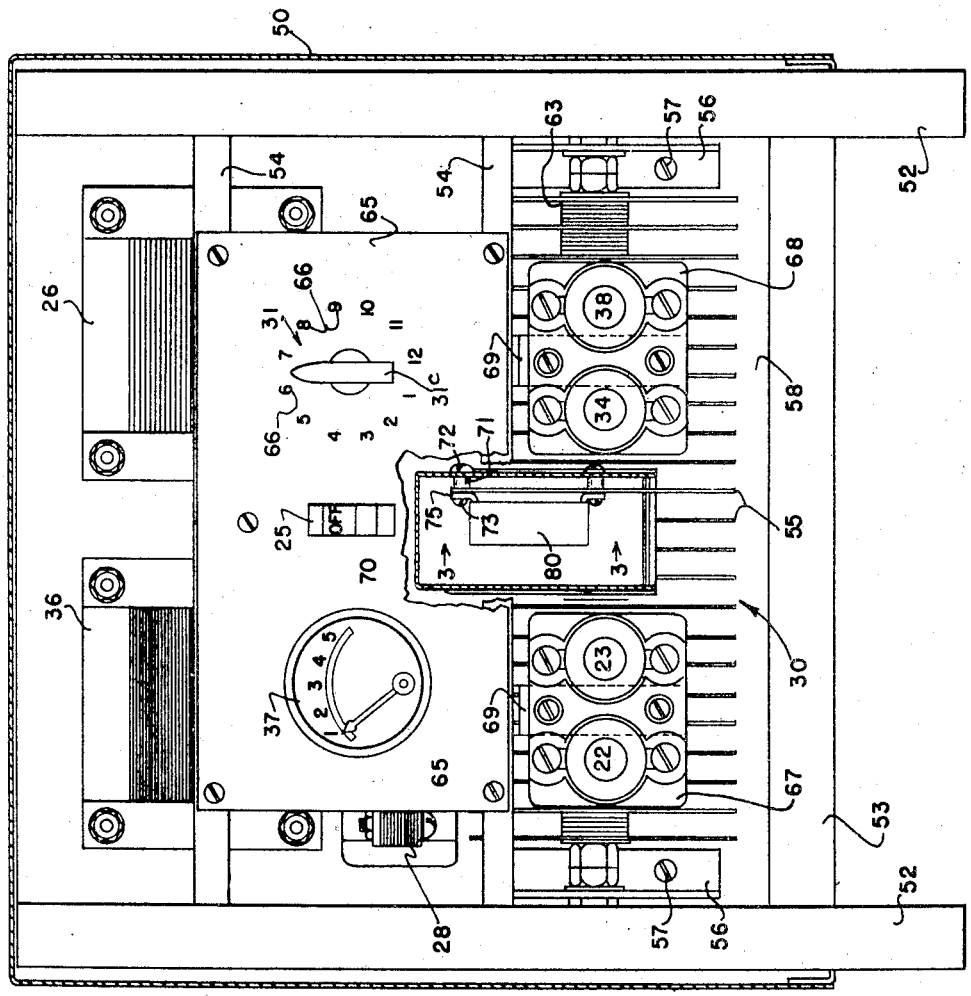

Before proceeding with a description of the details of the thermostatically controlled rectifier, reference may be had to Fig. 2 which illustrates, somewhat diagrammatically, the circuit connections of a system embodying the present invention and including the improved thermostatically controlled rectifier.

This improved rectifying system is adapted to operate upon commercial alternating current circuits, such as the usual 110 volt alternating current circuit, and the current from this circuit is supplied through conductors 20 and 21 which lead through fuses 22 and 23, respectively, to the terminals of the double pole switch 25. The other terminals of this switch are connected to the terminals of the primary winding 26ª of a transformer 26 which has its secondary winding 26ᵇ connected at 27 to one terminal of an impedance coil 28. The other terminal of this impedance coil is connected by a conductor 29 to one of the intake terminals of a rectifier unit 30 which is of the dry plate type comprising a series or stack of parallel plates or disks, such as copper oxide disks or selenium cells. The opposite terminal portion of the secondary winding 26ᵇ of the transformer is connected by a step-by-step switch 31 through a conductor 32 with the other intake terminal of the rectifier unit 30. The switch 31 has a movable contact arm 31ª which is adapted to contact any one of a number of stationary contacts 31ᵇ for adjusting the number of turns of the secondary winding 26ᵇ which are actively included in the circuit, thereby making it possible to vary the voltage imposed upon the rectifier unit 30.

One output terminal of the rectifier unit 30 is connected by a conductor 33 through a fuse 34 to one terminal of a battery 35 and the other output terminal of the rectifier unit 30 is connected through a choke coil 36, an ammeter 37, a fuse 38 and a conductor 39 to the other terminal of that battery. If the system is not to be used for battery charging purposes but to effect the operation of some other electrical appliance 40, the conductors 33 and 39 may be connected through the fuses 34 and 38, respectively, to the appliance 40 instead of to the terminals of the battery 35.

For the purpose of regulating the operation of the rectifier unit 30, arrangements are made for normally short-circuiting the winding of the impedance coil 28 through conductors 41 and 42 which are connected to a stationary contact member 43 and a movable contact member 44, respectively, which form parts of the thermostatic switch previously referred to. The movable contact member 44 is in engagement with the stationary contact 43 during the normal operation of the system within safe temperature limits but the contacts are adapted to be separated to include the impedance coil 28 in the active circuit by an actuating member 45 which is connected to the intermediate part of a thermostatic element 46 mounted on supporting members 47. The thermostatic member 46 and the supports 47 are located in proximity to one of the plates of the rectifier unit and are directly connected thereto while at the same time being insulated from the ambient temperature of the rectifier unit by being enclosed within a casing indicated by dotted lines at 48 in Fig. 2. This casing is filled with heat insulating material so that the thermostatic element 46 is responsive only to changes in temperature of one of the plates or disks of the rectifying unit and not to variations in the temperature of the surrounding atmosphere. If there is an undue rise in the temperature of the connected plate or disk of the rectifier unit, the thermostatic element 46 moves automatically from the position shown by full lines in Fig. 2 to the position shown by dotted lines, thus causing the actuating member 45 to open the contacts 43 and 44 and thereby remove the short circuit of the impedance coil 28 so that the resistance and reactance of this coil then reduce the input current of the rectifier unit 30 and thus bring about a reduction in the temperature of the plates of the unit. After a suitable reduction has taken place, the thermostatic element 46 again returns to the position shown by full lines in Fig. 2, whereupon the contacts 43 and 44 are closed and the impedance coil 28 is again short-circuited. In this manner, an undue rise in temperature of the plates of the rectifier unit is prevented. Instead of connecting the actuating member 45 of the thermostatic device to contacts controlling the impedance coil 28, the actuating member 45 could be connected to the movable element of a switch connected in the primary switch of the transformer 26 in order to open the supply circuit when an undue rise in temperature of the plates of the rectifier unit takes place. Such a switch is shown at 49 and an actuating member 45' is shown as being connected to the movable contact of this switch.

The principal units of the apparatus shown diagrammatically in Fig. 2 are illustrated more in detail in Figs. 1, 3 and 4 where the rectifier unit 30, the thermostatic switch and other parts are shown as being housed within a housing 50. This housing encloses a frame structure comprising a plurality of vertical members 52 connected by the lower horizontal members 53 and upper horizontal members 54. The rectifier unit 30 is mounted on the frame structure in the lower part of the casing 50 with its axis extending horizontally. Although this rectifier unit may be any one of various types, the form illustrated may be considered as being a rectifier of the selenium cell type in which a plurality of plates 55 are arranged in parallel relationship and spaced apart with their central apertures engaged by a horizontal supporting shaft which is mounted at its ends in the brackets 56 secured by the screws 57 to a supporting panel 58. Each plate or cell 55 is made up of a back plate or electrode 60, an intermediate layer of selenium 61 and a front metallic plate or electrode 62, the layer 61 and the front layer 62 being separated by the usual barrier layer. The composite plates 55 which are thus formed are separated from each other on the supporting shaft by disks 63. The horizontal members 54 of the frame structure carry a supporting panel 65 upon which is mounted the dial of the ammeter 37, the operating member of the manually operated switch 25 and the operating arm 31ᶜ of the step-by-step switch 31. This arm carries a pointer which travels over a series of graduations 66 on the face of the panel 65 which indicate the various positions of the movable switch arm 31ª with respect to the stationary contacts 31ᵇ. The transformer 26 and the choke coil 36 are mounted in the upper part of the housing 50 at the rear of the panel 65 and the impedance coil 28 and other parts of the apparatus may be conveniently located behind the panel 65. The fuses 22 and 23 are mounted on a plate 67 and the other fuses 34 and 35 are mounted upon another plate 68, both of these plates being secured to brackets 69 which are secured to the lower transverse frame member 54 so that they occupy positions in front of the plates of the rectifier unit 30. The thermostatic switch, by which the operating circuit is controlled, is located in a casing 70 formed of hard rubber, Bakelite or other suitable non-metallic material, the upper part of which is located behind the panel 65, while the lower part thereof extends downwardly in front of the rectifier unit 30.

For the purpose of effecting the cooling of the rectifier unit by the transfer of heat to the surrounding air, the back plates or electrodes 60 of the rectifier elements 55 are preferably extended beyond the circular layers 61 and 62, as shown in Fig. 3, in order to provide metallic cooling fins which furnish an extensive area of contact with the surrounding atmosphere. In order to make the thermostatic device responsive directly to the temperatures of the rectifier elements 55, the back plate 60 of one of these elements, preferably one located at or near the center of such elements in the stack, is provided with a forwardly projecting extension or flange 60ª which extends into the casing 70 through a slot in the rear wall thereof. The casing 70 is secured to and supported upon the extension 60ª of this plate through two insulating sleeves 71, each of which is internally threaded for engagement by a screw 72 passing through a hole in the vertical wall of the casing. The inner threaded ends of the insulating sleeves 71 are engaged by other screws 73 which pass through apertures in the extension 60ª of the rectifier plate and which also engage apertures in flanges formed on a supporting bracket 75 upon which the thermostatic element 46 is mounted. This thermostatic element 46 is located in the chamber 76 between the extension 60ª of the rectifier plate and the body portion of the bracket 75 and its edges engage grooves in supporting posts 77 which are fixed on the bracket 75. The middle point of the thermostatic element 46 has a fixed connection with the actuating member 45 previously referred to and this actuating member passes through aligning apertures which are formed in the bracket 75 and in an insulating plate 78 secured to the side of this bracket opposite the thermostatic element 46. The free end of the actuating element 45 carries a small plate which engages the side of the movable switch arm 44 previously referred to and that arm has one end fixed in a supporting bracket 79 which is secured to the face of the insulating plate 78. The free end of the switch arm 44 carries a contact member 44ª which is adapted to engage the stationary contact member 43, also secured to the face of the insulating plate 78. In the normal operation of the rectifying system, the thermostatic element 46 occupies the position shown by full lines in Fig. 4, which corresponds to the position shown by full lines in Fig. 2, wherein the contacts 43 and 44 are in engagement with each other but, when there is an undue rise in the temperature of the plate 60, the thermostatic element 46 is heated by reason of its close proximity to the extension 60ª of the plate and by reason of its direct connection through the post 77 and the bracket 75 with the plate extension 60ª so that the thermostatic element then snaps to the position shown by dotted lines and moves the switch arm 44 to the position shown by full lines in Fig. 4.

In order to cause the thermostatic element 46 to be responsive only to the temperature of the thermostatic plate 60, and not to the temperature of the atmosphere in the vicinity of the rectifier unit 30, the thermostatic element 46 and the switch contacts 43 and 44, with their supporting parts, are enclosed by a cap 80 which has a tight frictional engagement with the laterally extending parts of the bracket 75 so that it is thus maintained in place and forms a chamber enclosing the switch members 43 and 44. As a further means of insuring that the thermostatic element is responsive only to changes in temperature in one of the rectifier plates, the entire thermostatic switch mechanism within the casing 70 is insulated from the surrounding atmosphere by a body of heat insulating material 81, made up of rock wool or the like, in powdered or granular form, which occupies all of the spaces within the casing 70 around the chambers which are formed by the brackets 75 and the cap 80. The casing 70 is preferably formed as a molded body of non-metallic material and it is open at the bottom to permit the assembly of the switch apparatus therein and to permit the filling of the casing with the insulating material 81. After this material has been packed into the casing 70, a bottom plate 70ª is fitted into the lower end of the casing and is then secured in place by one or more bars 82 which engage apertures in the side walls of the casing and which may have their ends bent downwardly to hold them in place.

Figure 5:
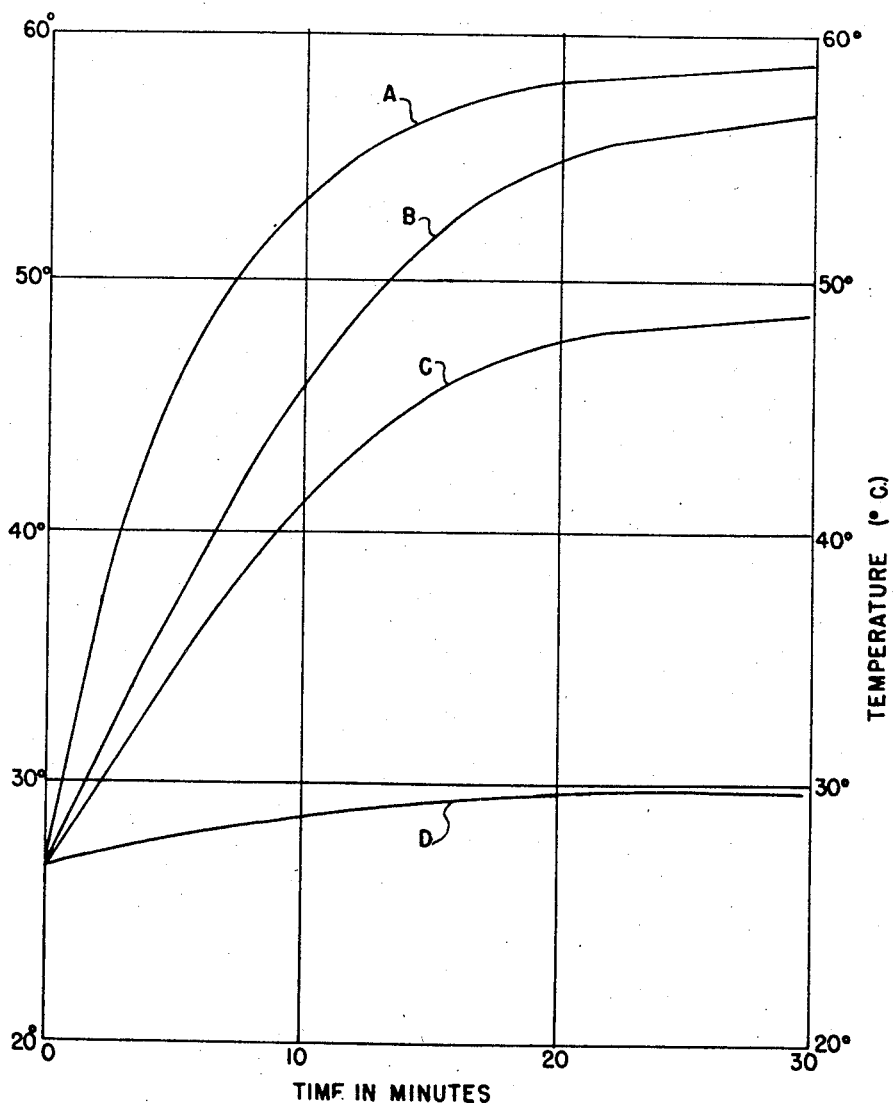
Fig. 5 is a chart showing a number of curves which illustrate the variations of temperature with lapse of time of various parts of the apparatus embodied in the improved system and of the ambient temperature in the region of the thermostatic switch.

From the foregoing description it will be apparent that applicant has provided improved rectifying apparatus in which means directly responsive to changes in temperature of the thermostatic elements, as distinguished from their ambient temperature, are provided for controlling either the input or the output circuit of a rectifying system in order to prevent undue rise in temperature of the parts of the rectifier unit. This control may be employed in the manner illustrated in the drawings in order to bring into the active circuit connection a resistance or impedance device which will operate to limit the current input and, if desired, similar apparatus may be employed to effect the successive cutting in of a series of resistances or impedances in order to cause a gradual reduction of the input current over a considerable range. The advantage of controlling the actuation of the circuit by the system of the present invention will be further apparent from a study of Fig. 5 of the drawings in which the abscissas represent lapse of time and the ordinates represent changes of temperature in degrees centigrade. The curve A represents actual increases in temperature during a period of 30 minutes of a rectifier element, such as those described, located in the central part of the stack with the system operating upon a 100 per cent overload. The curve B represents changes in temperature of the thermostatic switch within the cap 80 during the same period of time and under the same load. It will be observed that these curves follow along more or less parallel lines through a range of temperatures extending from approximately 30° centigrade to a point where temperatures between 55° and 60° centigrade are reached. The curve C shows the range of temperatures of the same thermostatic switch when it has not been insulated from the ambient temperatures of the rectifier unit. It will be observed that with lapse of time and rise in temperature, there is a falling away of the temperature of the switch, under these conditions, from the corresponding temperatures of a rectifier element of the stack, indicated by the curve A. The curve D illustrates changes in the temperature of the air in close proximity to the stack of rectifier elements under the same conditions of operation and with the same degree of overload, demonstrating clearly that there is a very wide difference between the ambient temperature of the rectifier unit and the actual temperatures of the plates which make up the rectifier elements. The present invention, therefore, provides a control of the rectifying system which is accurately responsive to changes in temperature of the rectifier plates.

Although one form of the invention has been shown and described by way of illustration, it will be understood that it may be constructed in various other embodiments which come within the scope of the appended claims.

I claim:

1. A rectifying system comprising a dry plate rectifier an operating circuit for said rectifier, and means directly responsive to changes in temperature of a plate of said rectifier and insulated from the ambient temperature of said rectifier for controlling said circuit.

2. A rectifying system comprising a dry plate rectifier having a plurality of rectifier elements, an operating circuit for said rectifier, a thermostatic switch directly connected to one of said elements and included in said circuit to control the operation of said circuit in response to temperature changes in said one element, and means for insulating said thermostatic switch from the ambient temperature of said elements.

3. A rectifying system comprising a rectifier having a rectifier element including a metallic plate, an operating circuit for said rectifier, a thermostatic switch having a heat conducting connection with said plate and included in said circuit, a casing enclosing said switch, and heat insulating material occupying said casing around said switch.

4. A rectifying system comprising a rectifier having a plurality of spaced rectifier elements arranged in a stack, one of said elements having a metallic projection extending outwardly beyond the other elements, an operating circuit for said rectifier, and a thermostatic switch mounted on and in heat conducting relation to said extension and insulated from the ambient heat of the remaining parts of said rectifier, said switch being connected in said operating circuit.

5. A rectifying system comprising a rectifier having a plurality of spaced rectifier elements arranged in a stack, one of said elements having a metallic projection extending outwardly beyond the other elements, an operating circuit for said rectifier, a thermostatic switch mounted on and in heat conducting relation to said extension and insulated from the ambient heat of the remaining parts of said rectifier, said switch being connected in said operating circuit, a casing carried by said extension and enclosing said switch, and heat insulating material surrounding said switch within said casing.

6. A rectifying system comprising a rectifier having a metallic plate, a thermostatic switch mounted on and in heat conducting relation to said plate, a cap carried by said plate to form a chamber for said switch, a casing carried by said plate and enclosing said cap and said switch, and heat insulating material surrounding said cap and said switch within said casing.

7. A rectifying system comprising a rectifier having a plurality of spaced rectifier elements each composed of a plurality of disks and a plate extending beyond said disk to form cooling fins, an operating circuit for said rectifier, and a thermostatic switch carried by one of said fins in heat conducting relation thereto and insulated from the ambient heat of the remaining parts of said rectifier and connected in said circuit for controlling the operation of said rectifier.

8. A rectifying system comprising a rectifier having a plurality of spaced rectifier elements each composed of a plurality of disks and a plate extending beyond said disk to form cooling fins, an operating circuit for said rectifier, one of said fins having a metallic extension, and a thermostatic switch mounted in heat conducting relation to said extension and insulated from the ambient heat of the remaining parts of said rectifier and included in said circuit for controlling the operation of said rectifier.

OTHO D. GRANDSTAFF.

REFERENCES CITED

The following references are of record in the file of this patent:

UNITED STATES PATENTS

| Number | Name | Date |
|---|---|---|
| 1,738,113 | Ogden | Dec. 3, 1929 |
| 1,959,513 | Weyandt | May 22, 1934 |
| 2,159,537 | Stevens | May 23, 1939 |
| 2,356,588 | Herrmann | Aug. 22, 1944 |
| 2,261,725 | Hoppe | Nov. 4, 1941 |
| 1,975,484 | Seitz | Oct. 2, 1934 |

FOREIGN PATENTS

| Number | Country | Date |
|---|---|---|
| 525,652 | Great Britain | Sept. 2, 1940 |
| 608,894 | Germany | Feb. 2, 1935 |